(12) United States Patent  (10) Patent No.: US 9,525,728 B2
Sethi et al.  (45) Date of Patent: Dec. 20, 2016

(54) PREDICTION AND DISTRIBUTION OF RESOURCE DEMAND

(71) Applicant: Bank of America Corporation, Charlotte, NC (US)

(72) Inventors: Vince Sethi, Eastleigh (GB); David Ardley, Winchester (GB)

(73) Assignee: Bank of America Corporation, Charlotte, NC (US)

( * ) Notice: Subject to any disclaimer, the term of this patent is extended or adjusted under 35 U.S.C. 154(b) by 503 days.

(21) Appl. No.: 14/029,383

(22) Filed: Sep. 17, 2013

(65) Prior Publication Data

US 2015/0081877 A1  Mar. 19, 2015

(51) Int. Cl.
*G06F 15/173* (2006.01)
*H04L 29/08* (2006.01)

(52) U.S. Cl.
CPC ....... *H04L 67/1012* (2013.01); *H04L 67/1031* (2013.01)

(58) Field of Classification Search
CPC ............. H04L 67/1008; H04L 67/1002; H04L 67/1031
USPC ................................. 709/226, 217, 219, 229
See application file for complete search history.

(56) References Cited

U.S. PATENT DOCUMENTS

| 6,473,787 B2 | 10/2002 | Miloslavsky |
| 6,498,786 B1 * | 12/2002 | Kirkby ................. H04Q 3/0066 370/322 |
| 6,523,036 B1 | 2/2003 | Hickman et al. |
| 6,546,423 B1 | 4/2003 | Dutta et al. |
| 6,556,548 B1 * | 4/2003 | Kirkby ................. H04L 12/5695 370/322 |
| 6,581,104 B1 | 6/2003 | Bereiter |
| 6,601,084 B1 | 7/2003 | Bhaskaran et al. |
| 7,216,154 B1 * | 5/2007 | Chow ................. H04L 67/1002 709/219 |
| 7,239,877 B2 | 7/2007 | Corneille et al. |
| 7,403,993 B2 * | 7/2008 | John ....................... H04L 29/06 707/E17.009 |
| 7,542,881 B1 * | 6/2009 | Billiotte ................. G05B 17/02 703/2 |
| 7,558,674 B1 * | 7/2009 | Neilley .................... G01W 1/10 702/3 |
| 7,610,631 B2 | 10/2009 | Frank et al. |
| 7,647,590 B2 | 1/2010 | Archer et al. |
| 7,743,260 B2 | 6/2010 | Fetik |
| 8,103,776 B2 | 1/2012 | DeHaan |
| 8,132,166 B2 | 3/2012 | DeHaan |
| 8,244,836 B2 | 8/2012 | DeHaan |
| 8,271,975 B2 | 9/2012 | DeHaan |
| 8,315,198 B2 | 11/2012 | Corneille et al. |
| 8,467,803 B2 | 6/2013 | Ahluwalia |
| 8,477,613 B2 | 7/2013 | Karunakaran et al. |

(Continued)

*Primary Examiner* — Kristie Shingles
(74) *Attorney, Agent, or Firm* — Banner & Witcoff, Ltd.; Michael A. Springs

(57) ABSTRACT

A system for predicting one or more changes in demand for computational resources expected as a result of one or more events experienced by a business enterprise, and for selecting an appropriate distribution strategy for distributing computational tasks such that a single location with insufficient computational resources can communicate computational tasks in excess of a local computational resource capacity to one or more other locations for processing.

19 Claims, 7 Drawing Sheets

(56) References Cited

U.S. PATENT DOCUMENTS

| | | |
|---|---|---|
| 8,510,434 B2 | 8/2013 | Wang et al. |
| 8,521,783 B2 | 8/2013 | Corbea et al. |
| 8,527,578 B2 | 9/2013 | DeHaan |
| 8,533,716 B2 | 9/2013 | Lippett |
| 8,539,565 B2 | 9/2013 | Beletski et al. |
| 8,599,013 B1 * | 12/2013 | Baron, Sr. ............ H04W 4/021 340/539.1 |
| 9,152,666 B2 * | 10/2015 | Lin ................... G06F 17/30362 |
| 2012/0158633 A1 * | 6/2012 | Eder ................... G06F 19/3437 706/46 |
| 2013/0103823 A1 * | 4/2013 | DeJana ................ G06Q 10/04 709/224 |
| 2013/0262367 A1 * | 10/2013 | Coldicott .............. G06Q 10/06 706/52 |

* cited by examiner

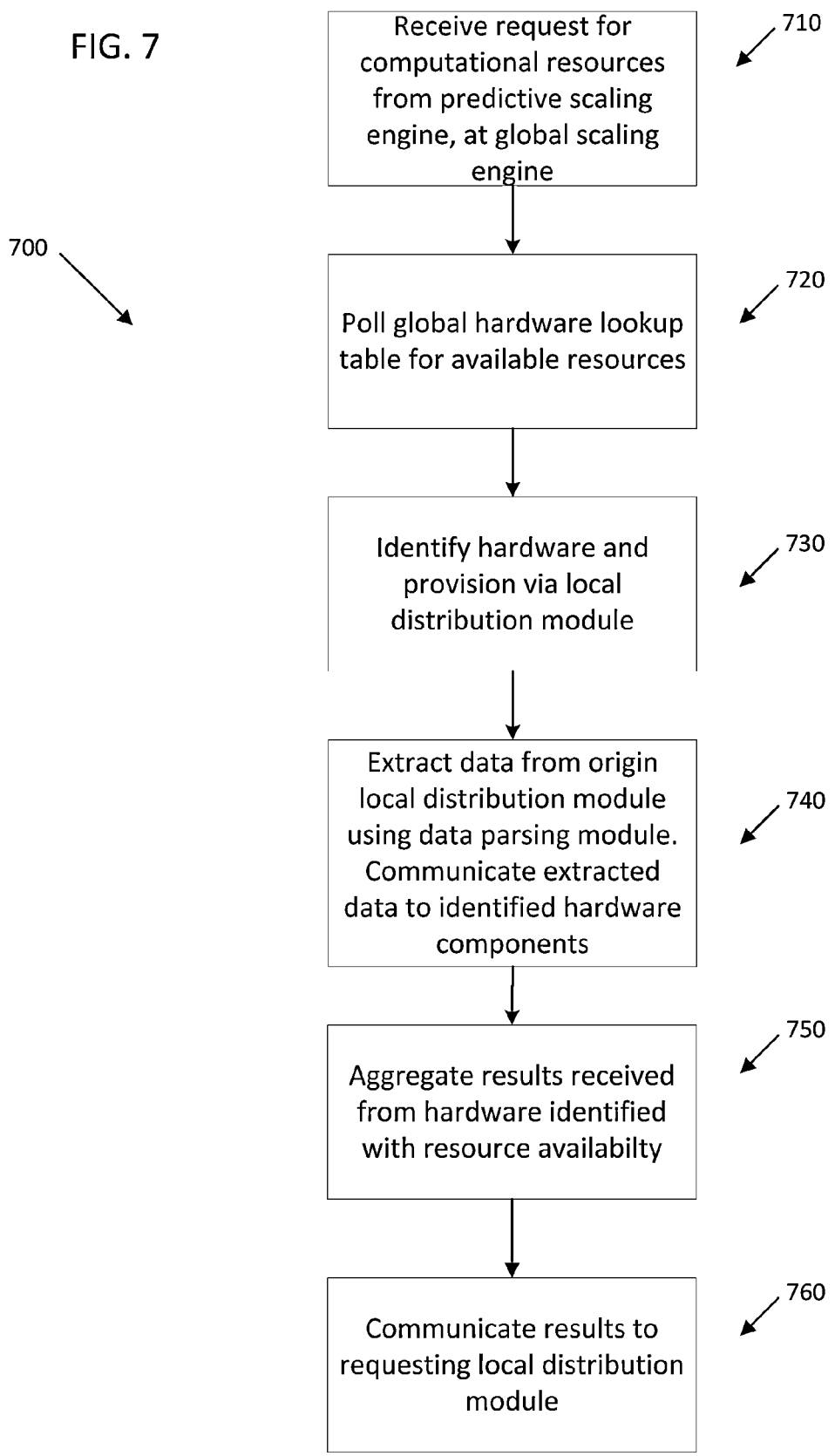

PREDICTION AND DISTRIBUTION OF RESOURCE DEMAND

TECHNICAL FIELD

Aspects of this invention generally relate to systems and methods for predicting changes in demand/requests for computational resources based on one or more identified events, and for distributing computational tasks amongst separated computational resources of a business enterprise as a result of these predictions.

BACKGROUND

Business enterprises may use large amounts of computational resources to support business operations. These computational resources may include processing time on central processing units to perform a plurality of calculations, or memory storage space, among others. In some instances, business enterprises may employ the services of a third-party to provide computational resource products, such as "cloud-based storage" services, and the like. In other instances a business enterprise may integrate the operation and maintenance of part or all of the computational resources used in support of business operations without employing the services of a third-party vendor. For example, a financial services company may operate and maintain tens, hundreds, or thousands of server computers in order to meet demands for storage and computational resources associated with the operations of the company. In some scenarios, such as those scenarios involving small and medium-sized enterprises (SMEs), these computational resources may be co-located, for example in a same server room, or a same office building, or spread out between multiple locations within a single geographic region, or country. In other scenarios, such as, for example, those related to multinational corporations (MNCs), computational resources may be distributed across multiple locations throughout the globe.

A business, such as an SME, MNC, or other size of business, may operate and maintain computational hardware to deliver computational resources to meet expected peak computational demands for a given location. For example, a given office of a financial services company may operate one or more on-site "server rooms" housing a plurality of server computers capable of providing computational resources to meet peak computational demands for the given office location. Furthermore, a business may operate additional computational hardware for redundancy, thereby maintaining computational capacity in times of partial failure of primary computational hardware. Accordingly, a business may operate and maintain computational hardware such that in order to meet peak computational demands, a portion of the total computational hardware lies idle during periods of average demand. This scenario may be associated with one or more locations of a business enterprise across a single geographic region, a country, or across multiple countries throughout the globe, and such that a business enterprise operates and maintains computational hardware and associated firmware and software services in excess of those computational demands received by the business enterprise on average.

Furthermore, certain events may be unexpected by business enterprises such that computational resources cannot meet demands. These events may be internal, such as, among others, a business decision to provide a new type of product, and the like. In other instances, these events may be external, such as, among others, a sudden rise in purchases from the company, unexpected adverse weather conditions affecting supply of a product to a geographic region, or an unexpected change in one or more financial markets around the world, among many others. Associated with each of these internal and external events may be a large increase, in demand for computational resources at one or more locations of a business enterprise, and wherein a given location of the business enterprise is unable to meet this increased demand for computational resources. However, in some instances, a business enterprise as a whole may comprise computational resources sufficient to meet an unexpected increase in demand, but is unable to redistribute computational tasks from one location to another due to, among others, incompatibility between computational resources at an origin location and an intended destination location, insufficient time for preparation to receive computational tasks at one or more locations in addition to an origin location experiencing increased demand, and/or impracticality associated with communicating large amounts of data to different locations in order to redistribute the computational tasks, among others.

Therefore, a need exists for improved systems and methods for distribution of computational tasks amongst separated computational resources of a business enterprise.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In one aspect, this disclosure relates to a system for predicting a change in a demand for computational resources, and for distributing computational tasks among available computational resources as a result of the predicted change in demand. The system includes a first local distribution module in communication with the first server, with the first server having a first level of computational resource availability. The system further includes a first event identification module for identifying one or more events from data received by the first local distribution module. Additionally, the system includes a first predictive scaling engine that identifies a change in requests for computational resources based on the identified one or more events. Furthermore, the predictive scaling engine identifies a second server in communication with the first local distribution module, wherein the second server has a second level of computational resource availability, and distributes computational tasks in excess of the first level of computational resource availability, to the second server.

In another aspect, this disclosure relates to a method for identifying, by a first event identification module associated with a first local distribution module, at least one event. The method further includes an identification, by a first predictive scaling engine, of an amount of computational resources that will be requested from the first server based on the identified at least one event. Additionally, the first predictive scaling engine identifies a second server connected to the first local distribution module that has computational resources available, and distributes an amount of computational tasks in excess of those resources available to the first server, for execution by the second server.

In yet another aspect, this disclosure includes a non-transitory computer-readable storage medium with computer-executable instructions for identifying at least one event from received data, wherein this identification is carried out by a first event identification module. In response, the instructions predict a level of computational resources that will be requested from the first server, and based on the identified at least one event. Further, the instructions identify second server in communication with the first local distribution module and distribute computational tasks in excess of the computational resource availability of the first server, for execution by the second server.

In another aspect, this disclosure describes an apparatus having a global distribution module, a first local distribution module, and a second local distribution module, wherein the first and the second local distribution modules are connected to the global distribution module. Additionally, the apparatus has a first server connected to the first local distribution module and a second server connected to the second local distribution module. Furthermore, the apparatus comprises a first event identification module for identifying at least one event from received data, and a first predictive scaling engine for identifying a first amount of computational resources that will be requested from the first server based on the identified event, and for distributing to the second server, computational tasks in excess of the computational resource availability of the first server, for execution by the second server.

Aspects of this disclosure address one or more of the issues mentioned above by disclosing methods, systems, non-transitory computer readable media, and apparatuses for establishing compatibility between an open-source data warehouse and a proprietary data warehouse. Aspects of the disclosure may also be provided in a non-transitory computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

FIG. 7 is a flowchart diagram of a process for distributing computational tasks amongst computational hardware resources that may be geographically dispersed.

DETAILED DESCRIPTION

Figure 1:
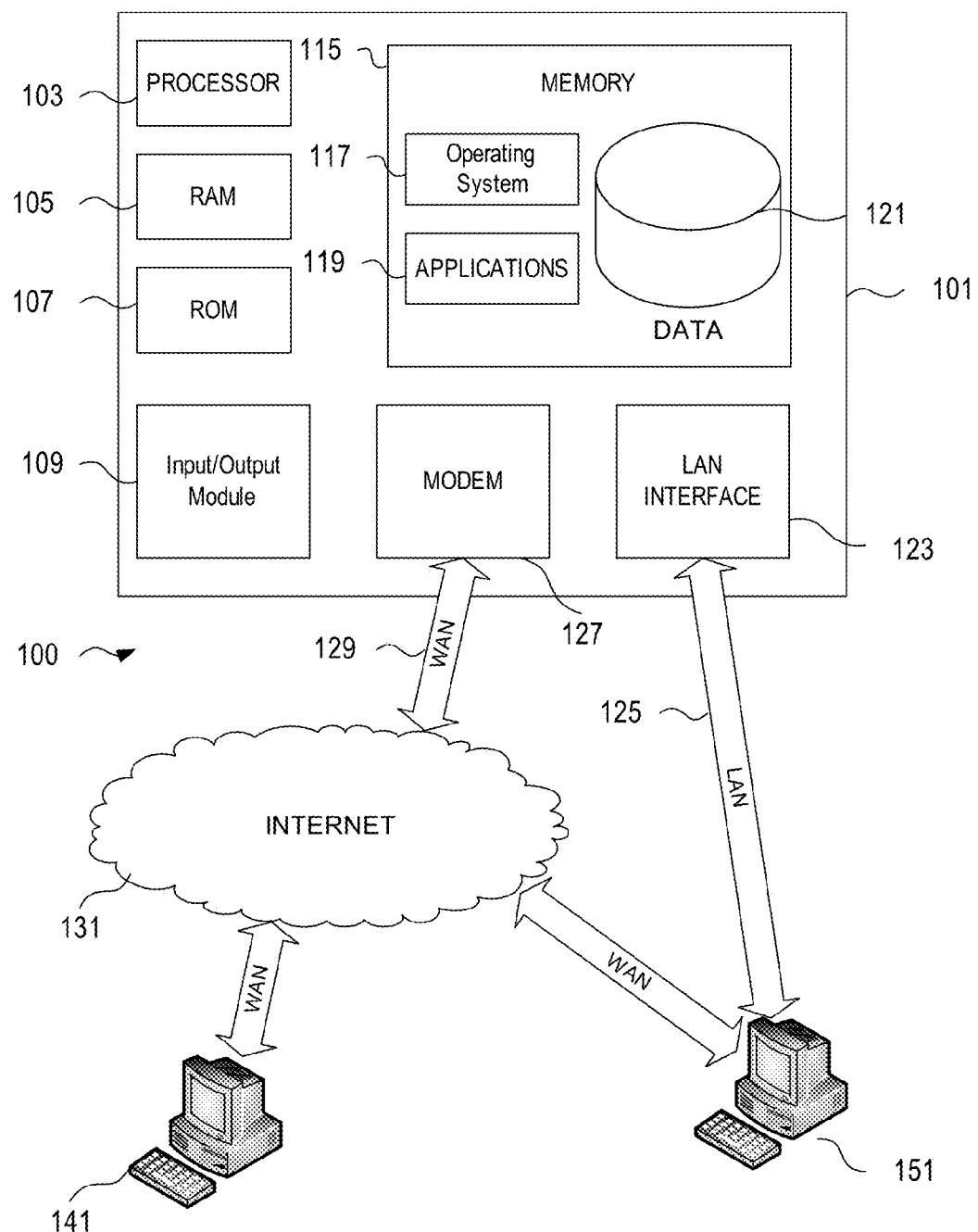
FIG. 1 illustrates a block diagram of an exemplary implementation of a system for predicting changes in computational demands, and for distribution of computational tasks among available computational resources.

As discussed above, there is a need for improved systems and methods for distribution of computational tasks amongst separated computational resources of a business enterprise. Such systems and methods may be used to predict, and to implement a distribution strategy that fulfills one or more requests for computational resources that is above a computational capacity of, in one implementation, a single server computer, a server rack comprising a plurality of server computers, or a data center comprising a plurality of server racks, among others. Furthermore, one or more requests for computational resources may be associated with a single geographic location, such as a single office building, or all the computational resources of a business within with a given geographic region, which may include multiple office buildings across multiple countries, and the like. In response to one or more requests for computational resources above a capacity associated with a first location, a distribution strategy implemented by the systems and methods described herein may identify computational hardware in a second location and/or a third location that have free capacity, and execute one or more processes to prepare the hardware at the second and/or third location to carry out the computational tasks in excess of the capacity of the first location. In this way, the systems and methods described herein provide for dynamic hosting of processes on distributed hardware, such that a first hardware component with computational resources insufficient to meet a level of requests for computational resources may distribute computational tasks to distributed hardware components. Accordingly, the distributed hardware components "host" (execute) the computational tasks to meet the level of requests from the first hardware component.

As described herein, a server computer (otherwise referred to as a "server," or simply as a "computer") used by a business enterprise to perform one or more computational tasks/processes associated with the operations of the business may be a general-purpose computer system used by a variety of different business types, or may be a specialized computer system that is purpose-built to service specific functions. Furthermore, a server, as described herein, may comprise one or more processing cores that may operate in parallel, and wherein parallel processing is well known to those of skill in the art. Additionally, although this disclosure may refer to one or more computational tasks that may be executed by one or more servers, a server may also be interpreted as one or more hardware, and/or supporting firmware and software components providing data storage to a business enterprise. Still further, while reference is made to "server" computers throughout this disclosure, one of ordinary skill will recognize that the systems and methods described herein may readily be applied to "client" computers, without departing from the scope of the description.

Throughout this disclosure, reference is made to one or more "demands" and/or "requests" for "computational resources." Accordingly, it will be understood that a "demand," or "request," in the context of this disclosure, refers to one or more calculations to be executed by a computer processor in order to carry out one or more processes of a computational system. Furthermore, a calculation may otherwise be referred to as a "task," or "job." It will be readily apparent to those of skill that such processes may vary widely depending upon, among many other things, the type of business enterprise associated with the processes. For example, and for a financial institution, such a "demand," or "request" may be associated with one or more processes used to provide products and/or services to one or more clients of the financial institution. "Computational resources" may refer to the hardware, and/or supporting firmware and/or software components, used to carry out one or more calculations associated with one or more processes of a computational system. In one implementation, "computational resources" refers to the availability of one or more processing cores of a computer for executing one or more calculations. In other implementations, "computational resources" refers to the availability of memory in a computer system, wherein the memory may be a form of volatile memory, such as random access memory (RAM), or a persistent form of memory.

As disclosed herein, a system may be used for predicting one or more changes in requests/demands for computational resources, and for allocating computational jobs/tasks to disparate and/or distributed computational resources available to a business enterprise at one or more geographic locations. In one implementation, the systems and methods described herein may predict one or more increases in demand for computational resources based on inputs to one or more local distribution modules. A local distribution module may be associated with, among others, a server, a server cluster, or a data center, and at one or more geographic locations. In another implementation, one or more local distribution modules may communicate with/be connected to a global distribution module to form a system for predicting changes in computational demands, and for distribution of computational tasks accordingly. As such, a local distribution module or a global distribution module may be implemented by dedicated or shared hardware of a computing device, such as computing device 101 from FIG. 1.

FIG. 1 illustrates a block diagram of an exemplary implementation of a system 100 for predicting changes in computational demands, and for distribution of computational tasks amongst available computational resources. System 100 may include one or more local distribution modules, and one or more global distribution modules, wherein a local or global distribution module may be implemented by one or more computing devices, such as computing device 101. Computing device 101 may have a processor 103 for controlling the overall operation of the computing device 101 and its associated components, including RAM 105, ROM 107, an input/output (I/O) module 109, and memory 115.

I/O module 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to the processor 103 for supporting the computing device 101 in performing various functions. For example, memory 115 may store software used by the computing device 101, such as an operating system 117, application programs 119, and an associated database 121. The processor 103 and its associated components may allow the computing device 101 to run a series of computer-readable instructions to predict a change in demand for computational resources associated with one or more events experienced by a business enterprise, and to distribute computational tasks amongst one or more available resources.

The computing device 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a data store that is affected by the operation of the alert management module 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the computing device 101 according to an illustrative embodiment of the disclosure, may include computer-executable instructions for invoking functionality related to identifying one or more events associated with a business enterprise, and in response, predicting one or more changes in demand for computational resources. Additionally, application program 119 may include computer-executable instructions for invoking functionality related to distributing computational tasks amongst available computational resources.

The computing device 101 and/or terminals 141 or 151 may also be mobile terminals, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
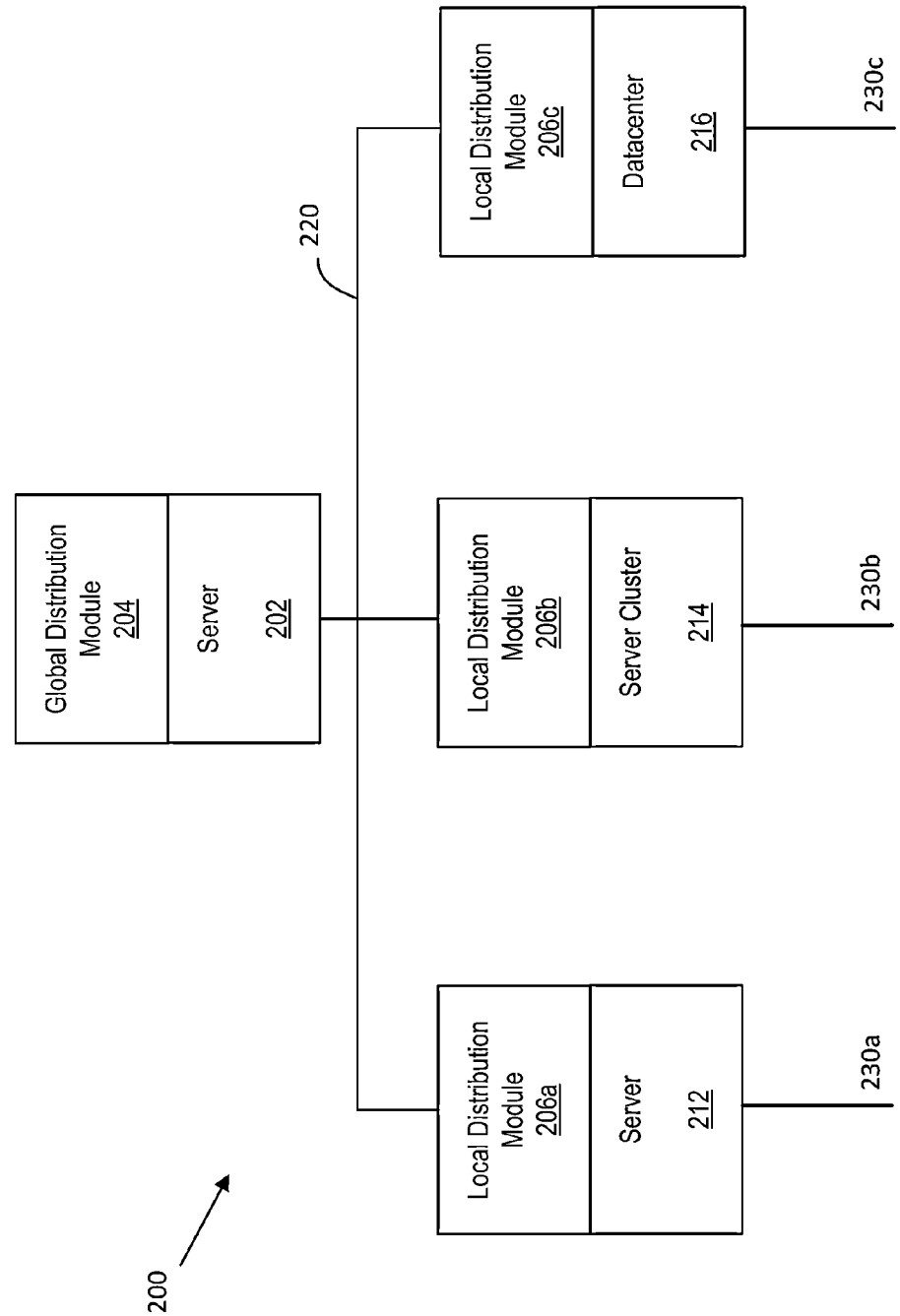
FIG. 2 is a schematic block diagram of a task prediction and distribution system.

FIG. 2 is a schematic block diagram of a task prediction and distribution system 200. In particular, system 200 includes a server 202, a global distribution module 204, local distribution modules 206a-206c, server 212, server cluster 214, data center 216, network 220, and network links 230a-230c. System 200 may execute one or more processes for identifying one or more events associated with a business enterprise, and in response, predicting one or more changes in a demand for computational resources from a server 212, a server cluster 214, or a data center 216. Furthermore, system 200 may execute one or more processes for distributing computational tasks such that a demand for computational resources in excess of resources available at a first location may be met by using computational resources available at one or more distributed locations. It will be readily apparent to those of skill in the art that server 212, server cluster 214, and data center 216 are exemplary of computer hardware, and supporting firmware and software resources that may range in size from a single computer to a large collection of networked computers that may include tens or hundreds of computer systems. In this way, server 212 may be a single computer with one or more processing cores. Furthermore, server cluster 214 may be a group of server computers comprising, in one example, 50 servers, and data center 216 may, in one implementation, comprise several hundred servers. Server 212, server cluster 214, and data center 216 may, in one implementation, be co-located at a single geographic location, such as, among others, an office building. In another implementation, each of server 212, server cluster 214, and data center 216 may be located at different geographic locations in a same, or a different country and/or time zone. Furthermore, it will be readily apparent to those of skill that the components depicted in FIG. 2 are representative of hardware, and supporting firmware and software component resources available to a business enterprise, or part thereof. Accordingly, local distribution modules 206a-206c may be representative of tens or hundreds of similar local distribution modules associated with the resources of the business enterprise, and connected by a network 220. Furthermore, where the depicted implementation of FIG. 2 includes a single global distribution module 204, a plurality of global distribution modules may be implemented within system 200 without departing from the scope of this disclosure.

Network links 230a-230c may form part of a local area network (LAN), a wide area network (WAN), a metropolitan area network (MAN), the Internet, or any other type of network infrastructure or communication system for transferring information between computer systems. Additionally, network links 230a-230c may be wired or wireless, and use one or more network protocols, such as Hyper Text Transfer Protocol (HTTP), Secure Hyper Text Transfer Protocol HTTPS), Secure Socket Layer (SSL), Secure Shell (SSH), Transport Layer Security (TLS), Fibre Channel network protocols, Internet Protocol Suite (TCP/IP), Bluetooth Protocol, among others. Accordingly, network links 230a-230c may connect server 212, server cluster 214, and/or data center 216 to an internal or an external network, wherein an internal network may connect computers associated with a single business enterprise/company, and an external network may connect computers associated with multiple enterprises, organizations, and/or individuals.

Network links 230a-230c may transfer information to server 212, server cluster 214, or data center 216, wherein the information represents one or more "events" that may give rise to a change in a demand for computational resources. Information received through network links 230a-230c may be processed by local distribution modules 206a-206c, respectively, wherein local distribution modules 206a-206c may identify one or more "events" from the received information, and predict a change in a demand for computational resources. For example, information received by server 212 on network link 230a may be communicated to local distribution module 206a. This information may be processed by local distribution module 206a to identify one or more events that may impact, or result in a change in a demand for computational resources available to server 212. In one embodiment, local distribution module 206a may predict a level, or an amount of demand for computational resources that is expected as a result of the one or more identified events. In some instances, a predicted demand for computational resources may be in excess of a level of computational resources available to server 212. Accordingly, local distribution module 206a may execute one or more processes to request that a level of demand in excess of computational resource availability at server 212 be met by computational resources associated with one or more other local distribution modules, such as local distribution module 206b or 206c. In this example, local distribution module 206a may communicate a request for additional computational resources through network 220, wherein network 220 may be a local area network (LAN), a wide area network (WAN), a metropolitan area network (MAN), the Internet, or any other type of network infrastructure or communication system for transferring information between computer systems.

In the exemplary embodiment of FIG. 2, a request for additional computational resources from local distribution processor 206a is communicated through network 220 to global distribution module 204 associated with server 202. Global distribution module 204 may be implemented as one or more processes on the hardware associated with server 202, or may be implemented on dedicated hardware in communication with a general-purpose server 202. Global distribution module 204 may, in turn, execute one or more processes to identify computational resource availability associated with one or more additional local distribution modules (206a-206c) connected through network 220. Furthermore, global distribution module 204 may facilitate distribution of a level of demand in excess of a computational resource availability at server 212, to the hardware, and/or supporting firmware and software components, associated with one or more of local distribution modules 206b and 206c.

Figure 3:
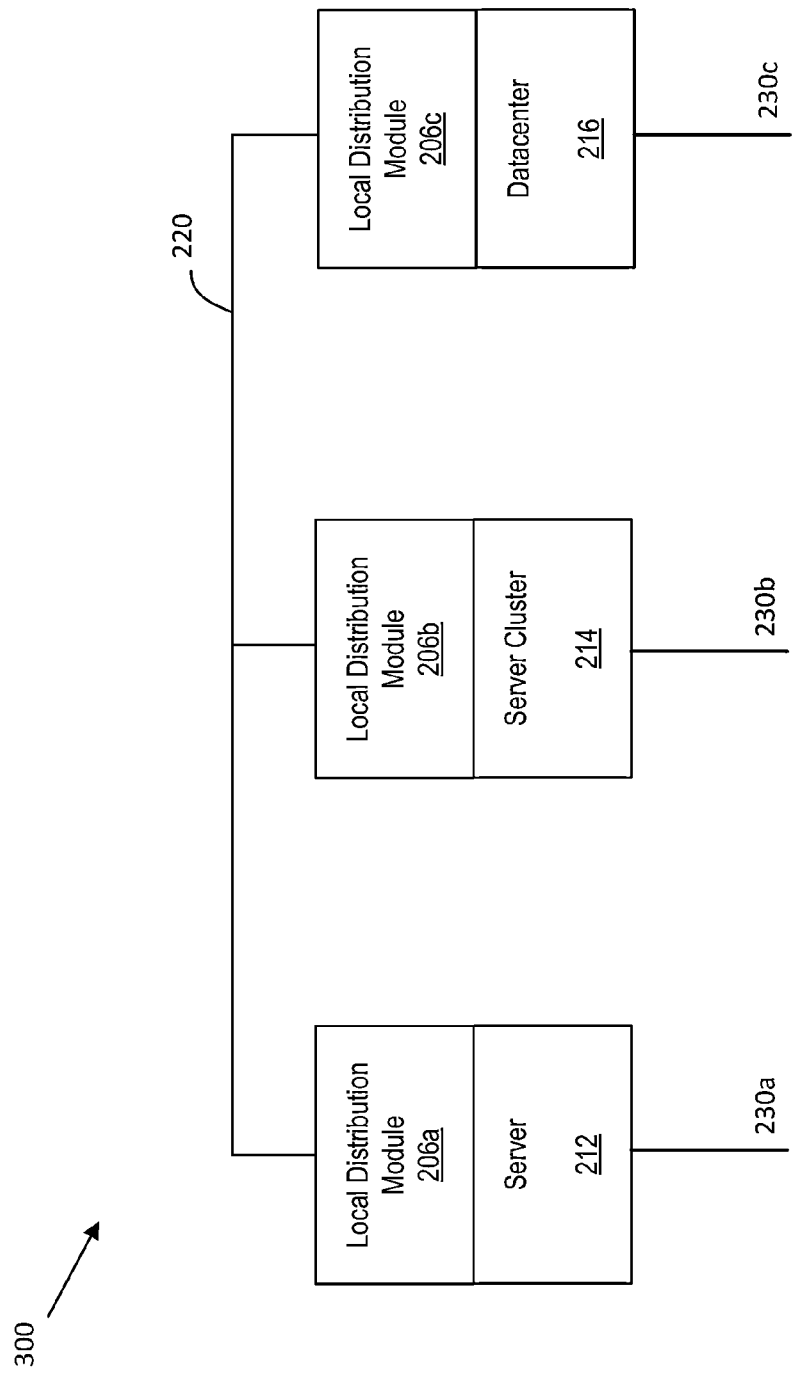
FIG. 3 depicts a schematic block diagram of a task prediction and distribution system.

FIG. 3 depicts a schematic block diagram of a task prediction and distribution system 300. In particular, system 300 depicts an alternative embodiment of a task prediction and distribution system to that of system 200 from FIG. 2. System 300 includes local distribution modules 206a-206c, server 212, cluster 214, data center 216, network links 230a-230c, and network 220. Accordingly, system 300 facilitates prediction of a demand for computational resources in response to one or more events received by components 212, 214, and/or 216. Furthermore, system 300 facilitates distribution of computational tasks amongst available hardware resources via network 220. In one example, information received via network link 230a is received by server 212 and communicated to local distribution module 206a. Local distribution module 206a may identify one or more events associated with the received information, and predict a change in a demand for computational resources from server 212. In one implementation, the predicted change in demand for computational resources may be in excess of those computational resources available to server 212. In such instances, local distribution module 206a may identify computational resource availability at one or more of local distribution modules 206b and 206c, and via network 220. Subsequently, local distribution module 206a may distribute those computational tasks in excess of the level of availability of computational resources at server 212 to those computational resources associated with one or more of local distribution modules 206b and 206c.

Figure 4:
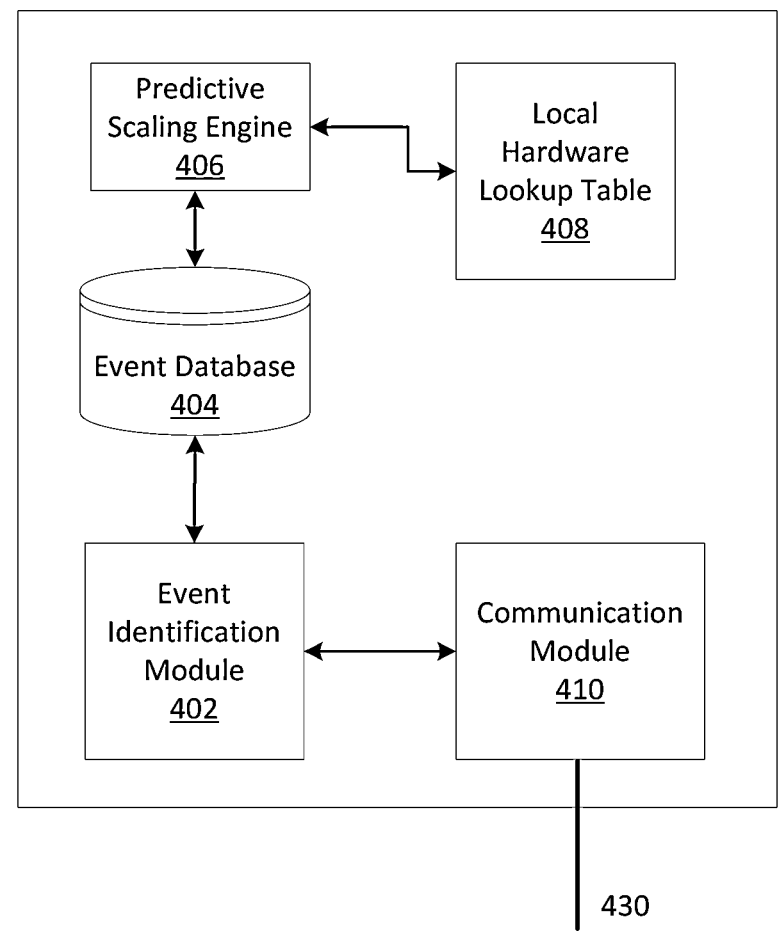
FIG. 4 depicts a schematic block diagram of a local distribution module.

FIG. 4 depicts a schematic block diagram of a local distribution module 206. In one embodiment, local distribution module 206 may be similar to local distribution module 206a, 206b, or 206c from FIG. 2 and FIG. 3. In particular, local distribution module 206 includes an event identification module 402, an event database 404, a predictive scaling engine 406, a local hardware lookup table 408, a communication module 410, and a network link 430. Local distribution module 206 may generally execute one or more processes to identify one or more events from received data, and in response, predict a change in a demand for computational resources. In this way, local distribution module 206 may be implemented as one or more processes executed using the computational resources of a server, a server cluster, or a data center, such as server 212, server cluster 214, or data center 216 from FIG. 2. In one implementation, local distribution module 206 may be executed as one or more processes running on an operating system associated with a server. In another implementation, local distribution module 206 may be implemented using separate and dedicated hardware and supporting firmware and software that is in communication with connected computational resources, such as server 212, server cluster 214, or data center 216 from FIG. 2. Accordingly, local distribution module 206 may be implemented by a computer, such as computer device 101 from FIG. 1, and wherein computer device 101 may be a general-purpose or specialized computer.

Local distribution module 206 may receive one or more data streams via network link 430. A data stream may include information from a wide variety of sources, such as an internal network associated with a business enterprise, the Internet, a cellular network, or a satellite network, among others. Furthermore, a data stream received through network link 430 may comprise information related to, among others, the internal operations of the business enterprise, including: account information, product performance information, and employee information, and the like. Additionally or alternatively, the data stream may include information related to external factors, such as: global financial markets, global politics, global shipping patterns, and global weather patterns, among many others. Information from network link 430 may be received by communication module 410, wherein communication module 410 comprises the hardware, and supporting software, for establishing connectivity to a network associated with network link 430. Communication module 410 may communicate one or more received data streams to an event identification module 402, wherein event identification module 402 may execute one or more processes to identify one or more "events" from the received data streams.

Event identification module 402 may execute one or more processes to parse received data into one or more "events." These one or more parsing processes may search for one or more keywords and/or strings within received data, and separate keywords and/or strings present in the data into identified events. In one example, a received data stream may include information related to global weather patterns. In one simple example, event identification module 402 may execute one or more processes to search for keywords such as "flood," or "storm," within the received weather pattern data stream. If either keyword is found, event identification module 402 may search for a geographic location associated with this information. For example, the received data stream may include the line "a flood warning has been issued across Western Europe in response to persistent rainfall over the past week." In response, event identification module 402 may identify a "severe weather" event for those countries in Western Europe. In other examples, event identification module 402 may execute one or more processes to search for keywords and/or strings associated with events related to global politics, global financial markets, global shipping patterns, or proceedings internal to a business enterprise, such as account information, product performance information, and employee information, and the like. In one implementation, event identification module 402 identifies one or more "events" based on one or more keywords and/or strings. In another implementation, event identification module 402 identifies one or more "events" based on predetermined rules. In one example, a data stream received by event identification module 402 may include information related to a relative value of two currencies. Event identification module 402 may, in one implementation, identify a "currency strengthening" event if a relative value of two currencies increases above a predetermined threshold value, among others.

In one embodiment, keywords, strings, and predetermined rules associated with one or more events are stored in an event database 404 such that, upon receipt of one or more data streams, event identification module 402 may parse the one or more data streams and search event database 404 for keywords, strings, and predetermined rules corresponding to one or more events. Accordingly, if no events are found that correspond to the received data, a new record may be entered into event database 404 with information characteristic of the received data.

In one implementation, event identification module 402 may identify one or more keywords, strings, or predetermined rules corresponding to one or more events in event database 404. In response, event identification module 402 may communicate an event identification signal to predictive scaling engine 406. Predictive scaling engine 406 may execute one or more processes to identify (predict) a level of computational resources that may be requested in response to one or more events. For example, and for a financial services business enterprise, upon identification of a "severe weather" event in Western Europe by event identification module 402, predictive scaling engine 406 may execute one or more processes to determine that there will be, in one example, a 50-75% increase in demand for computational resources in order to calculate/process insurance claims as result of storm damage to property. In one embodiment, predictive scaling engine 406 may predict a change in a demand for computational resources minutes, hours, days, weeks, or months in advance of a change in demand, wherein a change in demand may be a decrease, or an increase in requests/computations that are to be executed on hardware associated with local distribution module 206.

In one embodiment, predictive scaling engine 406 stores one or more response rules associated with an event, and upon receiving an event identification signal from event identification module 402, predictive scaling engine 406 may initiate a response based on the information stored within the response rules. In one implementation, predictive scaling engine 406 uses one or more reasoning/inference engines to determine a response based on one or more received events, wherein examples of reasoning/inference engines are known in the art.

In another embodiment, event identification module 402 may identify one or more unknown events that do not correspond to keywords, strings, or predetermined rules in event database 404. Upon identification of one or more unknown events by event identification module 402, predictive scaling engine 406 may record a causal relationship between a change in demand for computational resources and the identified unknown events, based on a change in demand for computational resources experienced by hardware associated with local distribution module 206 following one or more of the unknown events. Accordingly, predictive scaling engine 406 may save an observed change in demand for computational resources in association with one or more of the events. In this way, predictive scaling engine 406 may respond to an identification of one or more of the events with a predictive response in future. Furthermore, predictive scaling engine 406 may update those stored response rules for one or more events based on recorded changes in demand for computational resources following the respective events. For example, a "severe weather" event may be associated with a response will that predicts a 50-75% increase in demand for computational resources, but after multiple "severe weather" events, the average increase in demand for computational resources measures 75-90%. Accordingly, predictive scaling engine 406 may update one or more response rules associated with the "severe weather" event to reflect a predicted increase of 75-90%.

In one embodiment, predictive scaling engine 406 executes one or more stored response rules based on one or more events identified by event identification module 402. In one implementation, a response rule associated with predictive scaling engine 406 includes a number of calculations that may be requested based on an identified event, wherein the number of calculations may be an approximate value, and may be recorded using units of Hertz (Hz), or a measure of floating-point operations per second (FLOPS), among others. In another implementation, a response rule associated with predictive scaling engine 406 includes a length of time that a computational resource may be used for in order to fulfill computational requests associated with one or more events.

Local distribution module 206 includes a local hardware lookup table 408, wherein local hardware lookup table 408 stores details of all computational hardware in communication with local distribution module 206. Accordingly, local hardware lookup table 408 may include stored entries related to a plurality of servers connected to local distribution module 206. An entry in local hardware lookup table 408 may include, among others, details of a number of processing cores within a server, a clock speed (which may be expressed in units of Hertz, FLOPS, and the like) of each processing core, an amount of memory available to the server, a current level of availability of memory and processing power expressed as, in one implementation, the percentage of total memory, or percentage of total processing power, and a schedule of tasks to be performed by the server, wherein the schedule of tasks may be implemented as a queuing system, or processing stack machine, among others.

The predictive scaling engine 406, in response to a prediction of one or more changes in demand for computational resources, may execute one or more processes to search local hardware lookup table 408 for a current availability of one or more hardware components or servers associated with local distribution module 206. Accordingly, given a predicted amount of computational resources that may be used to fulfill computational demands associated with one or more events, predictive scaling engine 406 may search local hardware lookup table 408 and determine whether computational resources are available to local distribution module 206 to meet predicted demands.

In one implementation, upon identifying, by a predictive scaling engine 406, hardware within the local hardware lookup table 408 with computational resource availability capable of meeting a change in demand as a result of one or more events, predictive scaling engine 406 executes one or more processes to communicate with the identified hardware via a communication module 410. Accordingly, predictive scaling engine 406 may execute one or more processes to provision the identified local hardware in preparation for execution of the one or more computational tasks associated with the identified events. Furthermore, it will be readily understood to those of skill that any known provisioning method may be used by predictive scaling engine 406.

In another implementation, predictive scaling engine 406 may determine that the availability of computational resources within local hardware lookup table 408 does not meet a change in demand for computational resources associated with an identified event. Accordingly, predictive scaling engine 406 may execute one or more processes to communicate a request for additional computational resources to a global distribution module, such as global distribution module 204 from FIG. 5.

Figure 5:
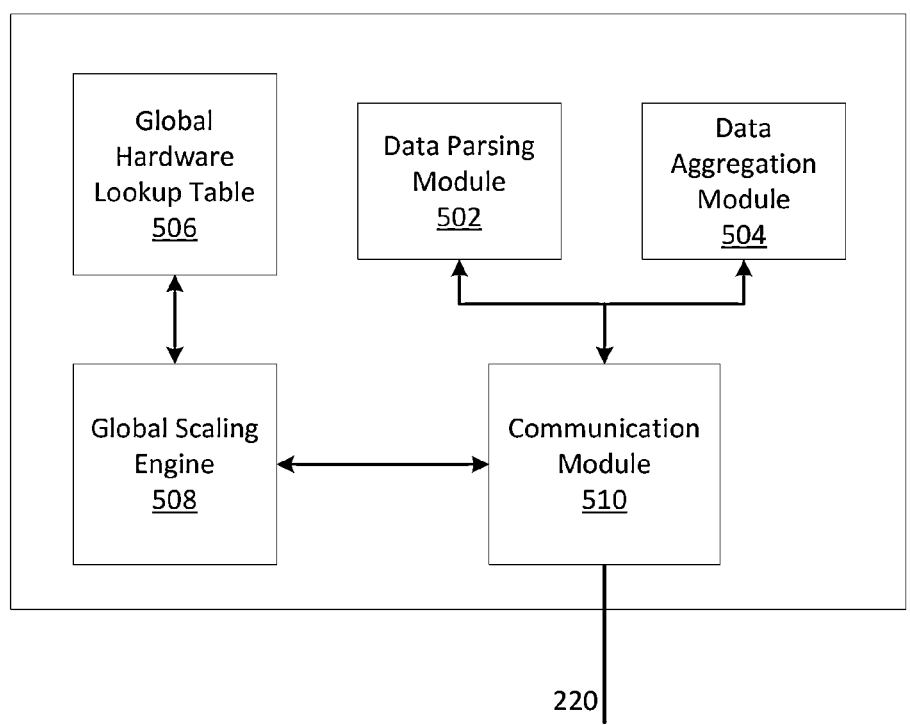
FIG. 5 is a schematic block diagram of a global distribution module.

FIG. 5 is a schematic block diagram of a global distribution module 204. In one embodiment, a global distribution module 204 includes a data parsing module 502, a data aggregation module 504, a global hardware lookup table 506, a global scaling engine 508, a global communication module 510, and a network link 220. In one implementation, global distribution module 204 may generally execute one or more processes to identify computational hardware with availability capable of meeting a change in demand for computational resources as a result of one or more identified events. Furthermore, global distribution module 204 may identify computational hardware with availability across one or more geographic locations, countries, or time zones.

Communication module 510 may be similar to communication module 410, and comprise the hardware, and supporting software for establishing connectivity to a network associated with network link 220. Global distribution module 204 may receive data representative of one or more requests for additional computational resources via network link 220, and from the local distribution module, such as local distribution module 206 from FIG. 4. In response, communication module 510 communicates the one or more requests to global scaling engine 508, wherein global scaling engine 508 may execute one or more processes to identify a type of request received from a local distribution module 206. In one implementation, a request may be for an amount of memory, an amount of time for processing one or more computational tasks, or a number of computational tasks that are to be completed within a predetermined time period, among others.

Global scaling engine 508, upon receiving a request for additional computational resources from a local distribution module 206, may execute one or more processes to search global hardware lookup table 506 for hardware resource availability. In one embodiment, global hardware lookup table 506 stores information related to hardware resources in communication with global distribution module 204, wherein hardware resources in communication with global distribution module 204 may be grouped based on one or more local distribution modules. For example, global hardware lookup table 506 may contain information related to hardware resources associated with three local distribution modules, such as local distribution modules 206a, 206b, and 206c from FIG. 2. Accordingly, hardware resources associated with local distribution modules 206a-206c may comprise hundreds or thousands of server computers. In one implementation, a local distribution module, such as local distribution module 206a, reports information related to an availability of each hardware component associated with local distribution module 206a, to global distribution module 204. In this example, the hardware components associated with local distribution module 206a may be server 212, from FIG. 2. Accordingly, global hardware lookup table 506 may store availability information for hardware components associated with all local distribution modules connected to global distribution module 204.

Global distribution module 204 may execute one or more processes to identify one or more hardware components with availability to meet a level of demand for computational resources in excess of available computational resources at a local distribution module from which a request for additional resources is received. Upon identification of one or more hardware components with available computational resources, global scaling engine 508 may execute one or more processes to distribute computational tasks amongst the identified hardware components. The computational tasks may, in one implementation, be scheduled by a local distribution module that is requesting additional computational resources from the global distribution module 204. Furthermore, the computational tasks may be parsed by the global distribution module 204, such that the amount of information that is transferred between local distribution module 206 and global distribution module 204 is reduced. For example, and as depicted in the exemplary embodiment of FIG. 2, a request for computational resources may be submitted to server 212. In one embodiment, server 212 may not have availability to meet the request for computational resources, and local distribution module 206a may request additional computational resources from global distribution module 204. In response, global distribution module 204 may identify available computational resources associated with local distribution module 206b and/or 206c. In order to fulfill the request for additional computational resources made by local distribution module 206a to global distribution module 204, data parsing module 502 may execute one or more processes to reduce the amount of information to be transferred between local distribution module 206a and global distribution module 204.

In one example, server 212 stores a table of values containing hundreds, thousands, or millions of data points. Computational resources may be used to manipulate this table of values by executing one or more computational tasks. However, in some instances, the computational tasks may only include a sub-group of the total number of data points within the table. Accordingly, upon receipt of a request for additional computational resources by global distribution module 204 from local distribution module 206a, data parsing module 502 may identify a sub-group of data points, from a complete table of data points to be processed. In one implementation, this sub-group of data points may measure one or more orders of magnitude less than the complete table of data points stored on server 212. Data parsing module 502 may extract the sub-group of data points, and distribute the sub-group amongst the available computational resources identified by global scaling engine 508. In this way, the amount of information to be transferred across network 220 may be reduced.

Data aggregation module 504 may execute one or more processes to combine the results obtained from distributed computational hardware such that the results may be communicated to a local distribution module 206 that requested additional computational resources from global distribution module 204. For example, and with reference to the components depicted in FIG. 2, a request for additional computational resources may be received from local distribution module 206a associated with server 212. In response, global distribution module 204 may identify hardware availability associated with local distribution module 206b, and in particular, server cluster 214. Data parsing module 502 associated with global distribution module 204 may identify a sub-group of data points to be processed, and communicate this sub-group from a server 212 to server cluster 214. Server cluster 214 may execute one or more processes to fulfill the request for additional computational resources, and communicate the results of the one or more calculations to global distribution module 204. Upon receipt of the results, data aggregation module 504, associated with global distribution module 204, may execute one or more processes to format the results such that they may be communicated back to local distribution module 206a.

Figure 6:
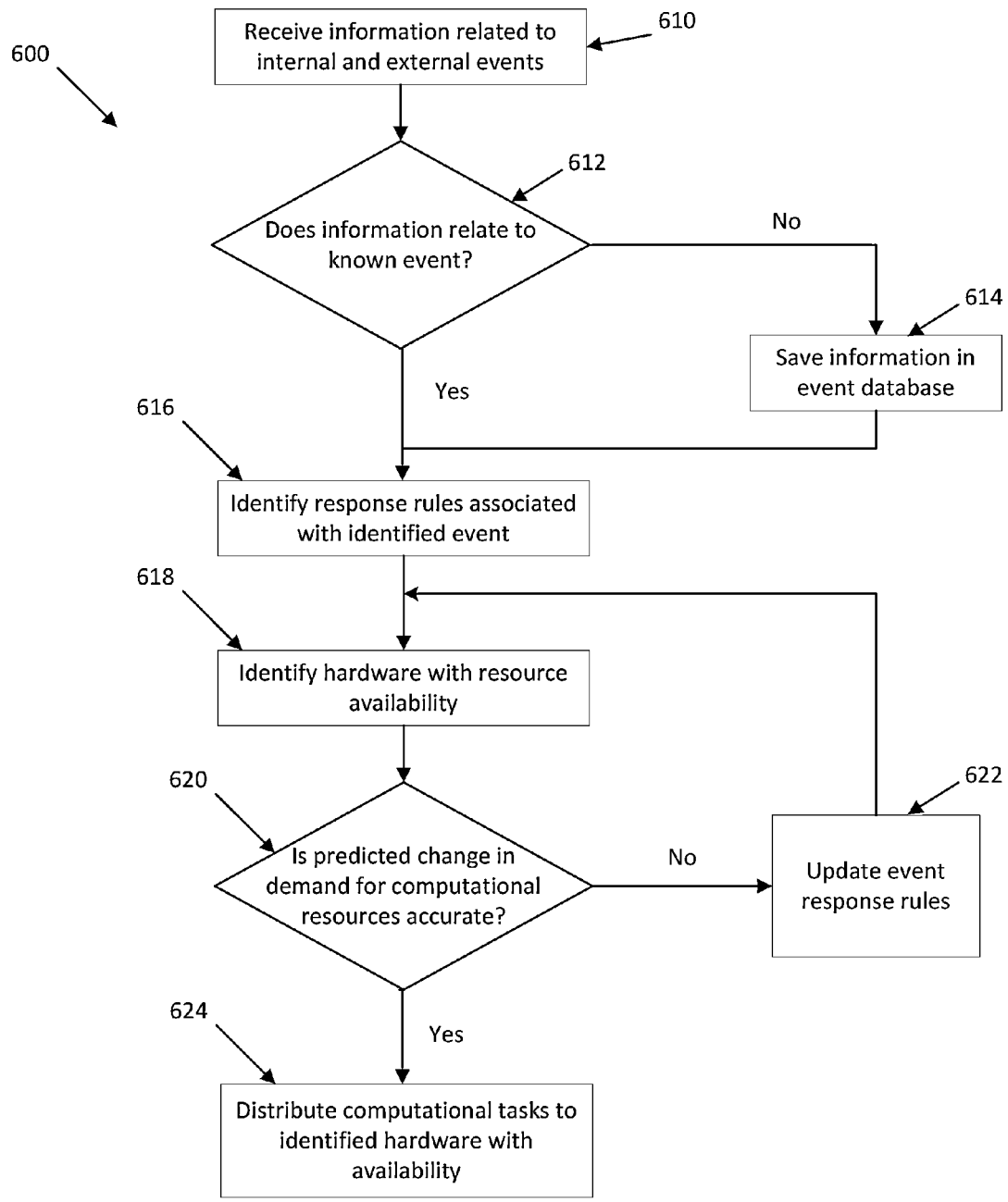
FIG. 6 is a flowchart diagram of a process for predicting changes in demand for computational resources, and for allocating computational tasks to distributed computational hardware.

FIG. 6 is a flowchart diagram of a process 600 for predicting changes in demand for computational resources, and for allocating computational tasks to distributed computational hardware. Process 600 will be described with reference to the components depicted in FIG. 2, FIG. 4, and FIG. 5. In particular, process 600 begins at block 610 when local distribution module 206a receives information related to one or more internal and/or external events. The received information may be processed by event identification module 402, and associated with local distribution module 206a.

Subsequently, process 600 proceeds to block 612, wherein block 612 represents one or more processes executed by event identification module 402 to determine if the information received by local distribution module 206a is representative of one or more "known" events, and wherein a "known" event is associated with a reference stored in event database 404. If no reference corresponding to the received information is stored in event database 404, process 600 proceeds to block 614. Block 614 represents one or more processes executed by event identification module 402 to store a new reference in event database 404 characteristic of the received information.

If, however, one or more references corresponding to the received information is found in event database 404, process 600 proceeds to block 616. Block 616 may represent one or more processes executed by predictive scaling engine 406 to identify one or more response rules associated with the one or more identified events. Accordingly, block 616 may represent a prediction, by predictive scaling engine 406, of one or more changes in demand for computational resources based on one or more identified events.

Block 618 represents one or more processes executed by predictive scaling engine 406 to identify hardware availability in order to meet a change in demand for computational resources as a result of an identified one or more events. Additionally, block 618 represents one or more processes to provision/schedule provisioning of hardware identified with resource availability.

Block 620 represents one or more processes executed by predictive scaling engine 406 to determine whether the response rules stored in association with one or more events were sufficient to predict a change in demand for computational resources. For example, upon identification of an event, predictive scaling engine 406 may execute a response rule associated with the event that specifies that an increase in demand for computational resources by 50% is predicted. In some instances, however, this response rule may be inaccurate. For example, the actual increase in demand for computational resources may be, in one embodiment, 75%.

As a result, predictive scaling engine 406 may update the response rule to reflect this new information. Accordingly, if, at block 620, predictive scaling engine 406 identifies a change in demand that does not correspond to a response rule, process 600 proceeds to block 622. At block 622, predictive scaling engine 406 updates one or more response rules associated with one or more events.

In another embodiment, if, at block 620, predictive scaling engine 406 identifies that a predicted change in demand for computational resources corresponds to an actual change in demand for computational resources, process 600 proceeds to block 624 wherein predictive scaling engine 406 distributes computational tasks to hardware with resource availability to meet the demand for computational resources.

FIG. 7 is a flowchart diagram of a process 700 for distributing computational tasks amongst computational hardware resources that may be geographically dispersed. In one embodiment, process 700 begins at block 710 with a request from a predictive scaling engine 406, associated with a requesting local distribution module 206, for additional computational resources, and wherein the request is made to a global scaling engine 508.

In response to a receipt of a request for additional computational resources by global scaling engine 508, process 700 proceeds to block 720, wherein global scaling engine 508 executes one or more processes to search global hardware lookup table 506 for hardware resources with availability to meet a level of demand for computational resources in excess of those associated with a local distribution module 206.

Global scaling engine 508 may identify, from the global hardware lookup table 506, one or more hardware components with computational resource availability. In response, process 700 proceeds to block 730. At block 730, global scaling engine 508 executes one or more processes to provision the hardware found from global hardware lookup table 506, wherein global scaling engine 506 may communicate with one or more local distribution modules 206 associated with the identified hardware resources with availability.

At block 740, process 700 extracts one or more data points from the requesting local distribution module 206 using a data parsing module 502. Subsequently, the extracted one or more data points are communicated to the identified hardware components with resource availability, wherein the identified hardware components may execute one or more computational tasks on the extracted data points.

Block 750 represents one or more processes executed by global distribution module 204 to combine, or aggregate, the results of the one or more computational tasks executed by the identified hardware components with resource availability. Subsequently, and as represented by block 760, global scaling engine 508 may communicate the processed data points to the requesting local distribution module.

The present disclosures further provide technical advantages. As noted above, a system 200 may allow for distribution of computational tasks amongst disparate, and dispersed computational hardware, wherein the computational hardware may be dispersed across different geographic regions, different countries, and/or different time zones. Advantageously, system 200 is hardware agnostic, such that, in the exemplary embodiment of FIG. 2, server 212, server cluster 214, and/or data center 216 comprise hardware manufactured by one or more different manufacturing companies. Additionally, a local distribution module, such as local distribution module 206a, 206b, and/or 206c or a global distribution module 204, may be implemented using dedicated hardware components, or may be implemented as one or more processes executed as software on shared hardware components. Accordingly, the local distribution modules 206a, 206b, and 206c, and global distribution module 204 are also software agnostic, such that they may be executed as part of any operating system known in the art, and as used on server computers, such as though servers associated with server 212, server 202, server cluster 214, and data center 216.

Additionally, and as depicted in FIG. 3, the systems and methods described herein may be used to distribute computational tasks in response to predicted changes in demand for computational resources as a result of one or more events without the use of a global distribution module 204. Similarly to system 200, system 300 is hardware and software agnostic, such that local distribution module 206a, 206b, and/or 206c may be implemented on server 212, cluster 214, and data center 216 comprising hardware and supporting software produced by plurality of different manufacturing companies. Accordingly, for system 300, the functionality of those components depicted in FIG. 5 may be replicated across one or more of local distribution module 206a, 206b, and 206c from FIG. 3.

Further advantageously, the systems and methods described herein may allow for distribution of computational tasks between distributed hardware components of a business enterprise. Accordingly, a demand for computational resources above an average demand for a first location within the business enterprise may be met by computational resources associated with a second and/or a third location within the business enterprise, which each may be in different respective geographic locations. Therefore, the systems and methods described herein may allow a business enterprise to reduce the amount of computational hardware operated and maintained at a given location such that the computational hardware as a given location need not meet a peak demand for computational resources experienced at the given location. In one embodiment, the systems and methods described herein may allow for distribution of computational tasks to geographic locations in time zones experiencing a low level of demand for computational resources. For example, a business enterprise may operate in two geographic locations, including New York City, USA, and London, UK. In one embodiment, the New York location experiences an increase in demand for computational resources at 4 PM. This increase in demand for computational resources is above a level of availability of computational resources at the New York location. However, due to the time zone difference between the New York and London locations, the computational resources associated with the London location may have high availability. Accordingly, the systems and methods described herein may be used to distribute computational tasks in excess of those that may be facilitated at New York location to the London location.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A system comprising:
    a processor, configured to execute a first local distribution module;
    a computer memory configured to store the first local distribution module; and
    the first local distribution module in communication with a first server having a first level of computational resource availability, the first local distribution module further comprising:
    a first event identification module, configured to: search a received information stream for a keyword related to adverse weather conditions;
    identify, based on the keyword being present within the received information stream, at least one geographic region predicted to experience an adverse weather event; and
    a first predictive scaling engine, configured to: identify a first amount of computational resources that will be requested from the first server based on the identified at least one geographic region predicted to experience an adverse weather event;
    identify a second server in communication with the first local distribution module having a second level of computational resource availability; and distribute to the second server, a first amount of computational tasks in excess of the first level of computational resource availability associated with the first server, for execution by the second server, wherein the first local distribution module further comprises a local hardware lookup table storing the first level of computational resource availability associated with the first server and the second level of computational resource availability associated with the second server.

2. The system according to claim 1, further comprising:
a global distribution module in communication with the first local distribution module and a second local distribution module, the global distribution module having:
  a global scaling engine, configured to:
    identify a third server in communication with the second local distribution module; and
    distribute, to the second local distribution module, a second amount of computational tasks in excess of the first level of computational resource availability associated with the first server, for execution by the third server,
  wherein the processor is further configured to execute the global distribution module.

3. The system according to claim 2, wherein the global distribution module further comprises:
a data parsing module, configured to extract, from a plurality of data points stored in the first server, a sub-group of data points associated with the second amount of computational tasks, to reduce an amount of information to be communicated between the first and the third server.

4. The system according to claim 1, wherein the predictive scaling engine further comprises a reasoning engine configured to determine a response to the identified at least one geographic region predicted to experience an adverse weather event.

5. The system according to claim 2, wherein the global distribution module further includes a global hardware lookup table storing the first level of computational resource availability associated with the first server, the second level of computational resource availability associated with the second server, and a third level of computational resource availability associated with the third server.

6. A method executed by a processor performing steps comprising:
identifying, by a first event identification module, based on a keyword being present within an information stream received by a first local distribution module, at least one geographic region predicted to experience an adverse weather event, wherein the first local distribution module is in communication with a first server, wherein the first server has a first level of computational resource availability;
identifying, by a first predictive scaling engine, a first amount of computational resources that will be requested from the first server based on the identified at least one geographic region predicted to experience an adverse weather event;
identifying, by the first predictive scaling engine, a second server in communication with the first local distribution module, and having a second level of computational resource availability; and
distributing, by the first predictive scaling engine, a first amount of computational tasks in excess of the first level of computational resource availability associated with the first server, for execution by the second server, wherein the first local distribution module further comprises a local hardware lookup table storing the first level of computational resource availability associated with the first server and the second level of computational resource availability associated with the second server.

7. The method of claim 6, wherein the first local distribution module and a second local distribution module are in communication with a global distribution module, and wherein the first and the second local distribution modules are in different geographic regions.

8. The method of claim 7, further comprising:
identifying, by a global scaling engine in communication with the global distribution module, a third server connected to the second local distribution module; and
distributing, by the global scaling engine, a second amount of computational tasks in excess of the first level of computational resource availability, for execution by the third server.

9. The method of claim 7, wherein the different geographic regions are in different time zones.

10. The method of claim 7, further comprising:
identifying the at least one geographic region predicted to experience an adverse weather event based on at least one predetermined rules stored in an event database.

11. The method of claim 7, wherein the identifying, by the first event identification module, further identifies an internal event associated with a business decision of a business enterprise.

12. The method of claim 7, wherein the identifying, by the first event identification module, further identifies an external event associated with at least one of a financial markets event, a political event, and a shipping event.

13. A non-transitory computer-readable storage medium having computer-executable program instructions store thereon that when executed by a processor cause the processor to perform steps comprising:
identifying, by a first event identification module of a first local distribution module, based on a keyword being present within a received information stream, at least one geographic region predicted to experience an adverse weather event from received data;
predicting a level of computational resources that will be requested from a first server in communication with the first local distribution module, based on the identified at least one geographic region predicted to experience an adverse weather event;
identifying a second server in communication with the first local distribution module; and
distributing a first amount of computational tasks in excess of a first level of computational resource availability associated with the first server, for execution by the second server,
wherein the first local distribution module further comprises a local hardware lookup table storing the first level of computational resource availability associated with the first server and a second level of computational resource availability associated with the second server.

14. The computer-readable storage medium of claim 13, wherein the computer-executable instructions, when executed by the processor, cause the processor to perform steps further comprising:
identifying a third server in communication with a second local distribution module; and distributing to the second local distribution module, a second amount of computational tasks in excess of the first level of computational resource availability associated with the first server, for execution by the third server.

15. The computer-readable storage medium of claim 13, wherein the first local distribution module is in a first geographic location, and a second local distribution module is in a second geographic location.

16. The computer-readable storage medium of claim 15, wherein the first and second geographic locations are in different time zones.

17. The computer-readable storage medium of claim 13, wherein the identifying, by the first event identification module, further identifies an internal event based on a business decision of a business enterprise.

18. The computer-readable storage medium of claim 13, wherein the identifying, by the first event identification module, further identifies an external event based on at least one of a financial markets event, a political event, and a shipping event.

19. An apparatus comprising:

a global distribution module;

a first local distribution module, and a second local distribution module in communication with the global distribution module;

a first server in communication with the first local distribution module, and having a first level of computational resource availability;

a second server in communication with the second local distribution module, and having a second level of computational resource availability;

a first event identification module, configured to:

search a received information stream for a keyword related to adverse weather conditions;

identify, based on the keyword being present within the received information stream, at least one geographic region predicted to experience an adverse weather event; and a first predictive scaling engine, configured to: identify a first amount of computational resources that will be requested from the first server based on the identified at least one geographic region predicted to experience an adverse weather event; and distribute to the second server, a first amount of computational tasks in excess of the first level of computational resource availability associated with the first server, for execution by the second server, wherein the first local distribution module further comprises a local hardware lookup table storing the first level of computational resource availability associated with the first server and the second level of computational resource availability associated with the second server.

* * * * *